United States Patent
Yamashita

(10) Patent No.: US 12,448,469 B2
(45) Date of Patent: Oct. 21, 2025

(54) POLYVINYL ALCOHOL-BASED POLYMER

(71) Applicant: DENKA COMPANY LIMITED, Tokyo (JP)

(72) Inventor: Akihiro Yamashita, Tokyo (JP)

(73) Assignee: DENKA COMPANY LIMITED, Tokyo (JP)

(*) Notice: Subject to any disclaimer, the term of this patent is extended or adjusted under 35 U.S.C. 154(b) by 504 days.

(21) Appl. No.: 17/927,523

(22) PCT Filed: Jul. 15, 2021

(86) PCT No.: PCT/JP2021/026688
§ 371 (c)(1),
(2) Date: Nov. 23, 2022

(87) PCT Pub. No.: WO2022/024791
PCT Pub. Date: Feb. 3, 2022

(65) Prior Publication Data
US 2023/0242687 A1    Aug. 3, 2023

(30) Foreign Application Priority Data

Jul. 31, 2020  (JP) .................. 2020-131225

(51) Int. Cl.
*C09K 8/467* (2006.01)
*C04B 24/26* (2006.01)
*C08F 16/06* (2006.01)

(52) U.S. Cl.
CPC .......... *C08F 16/06* (2013.01); *C04B 24/2623* (2013.01); *C09K 8/467* (2013.01); *C08F 2810/00* (2013.01)

(58) Field of Classification Search
CPC .... C08F 16/06; C08F 2810/00; C08F 216/06; C08F 8/12; C08F 218/08; C04B 24/2623; C04B 28/02; C04B 2103/46; C09K 8/467; C09K 8/487; C09K 8/035
See application file for complete search history.

(56) References Cited

U.S. PATENT DOCUMENTS

| | | | | |
|---|---|---|---|---|
| 4,314,032 A | * | 2/1982 | Murayama | ......... C08F 8/00 524/916 |
| 6,472,470 B1 | | 10/2002 | Fujiwara et al. | |
| 2007/0284104 A1 | | 12/2007 | Beckman | |
| 2017/0174971 A1 | | 6/2017 | Kumaki et al. | |
| 2020/0224076 A1 | | 7/2020 | Yamashita et al. | |
| 2020/0377780 A1 | | 12/2020 | Yamashita et al. | |

FOREIGN PATENT DOCUMENTS

| | | | | |
|---|---|---|---|---|
| CN | 111356667 A | 6/2020 | | |
| EP | 3686171 A1 | * | 7/2020 | ............ C09K 8/487 |
| JP | S55-104301 A | 8/1980 | | |
| JP | 2000-157625 A | 6/2000 | | |
| JP | 2000-309607 A | 11/2000 | | |
| JP | 2011173944 A | * | 9/2011 | |
| JP | 2015-196733 A | 11/2015 | | |
| WO | 2007/146348 A2 | 12/2007 | | |
| WO | 2019/163490 A1 | 8/2019 | | |
| WO | 2021/116678 A1 | 6/2021 | | |

OTHER PUBLICATIONS

Oct. 10, 2023 Extended Search Report issued in European Patent Application No. 21850134.4.
Jan. 10, 2025 Office Action issued in Taiwanese Patent Application No. 110127547.
Sep. 21, 2021 International Search Report issued in International Patent Application No. PCT/JP2021/026688.
Mikihito Takenaka et al., "Comparison in fractal dimension between those obtained from structure factor and viscoelasticity of gel networks of 1,3:2,4-bis-O-(p-methylbenzylidene)-D-sorbitol in polystyrene melt at gel point", Journal of Chemical Physics, vol. 121, No. 7, (2004), pp. 3323-3328.
Nov. 1, 2024 Office Action issued in Chinese Patent Application No. 202180035703.6.

* cited by examiner

*Primary Examiner* — Kumar R Bhushan
(74) *Attorney, Agent, or Firm* — Oliff PLC

(57) ABSTRACT

A PVA is excellent in heat resistance and pressure resistance. A polyvinyl alcohol-based polymer, as a saponificated product of a homopolymer composed of a vinyl ester monomer; a copolymer of a vinyl ester monomer and a monofunctional monomer other than the vinyl ester; a copolymer of a vinyl ester monomer and a polyfunctional monomer; or a copolymer of a vinyl ester monomer, a monofunctional monomer other than vinyl ester, wherein the polyvinyl alcohol-based polymer has a slope of 1.2 or less in a double logarithmic plot of storage elastic modulus G' (at 20° C.) in an angular frequency region of 1.0 to 10.0 rad/s, in measurement of an aqueous solution of the polyvinyl alcohol-based polymer filtered through a 100-mesh filter (opening: 0.154 mm) and then adjusted to a concentration of 10.0 mass %.

4 Claims, 1 Drawing Sheet

POLYVINYL ALCOHOL-BASED POLYMER

TECHNICAL FIELD

The present invention relates to a polyvinyl alcohol-based polymer and a use thereof.

BACKGROUND ART

A polymer having a polyvinyl alcohol (PVA) skeleton (hereinafter, also collectively referred to as "polyvinyl alcohol-based polymer", "vinyl alcohol-based polymer", or simply "PVA" in the present specification) is known as a hydrophilic synthetic resin, and various uses have been developed by taking advantage of the characteristics.

Examples of the uses include an additive to oil well cement used for cementing oil wells, gas wells, steam wells for geothermal power generation, etc. The oil well cement is mixed with water and other additives to form a slurry, which is filled in a gap between a steel pipe or casing and a well to fix and protect the steel pipe or casing. It is therefore preferable that the cement slurry have high fluidity for easy filling. Here, the loss of water content from the cement slurry due to high pressure at the time of injection and heat in the ground is generally referred to as "fluid loss". Fluid loss impairs the fluidity of the cement slurry, resulting in poor cementing and poor curing after curing of the cement. Accordingly, a cement slurry usually contains a fluid loss reducing agent.

It has been proposed to use a polyvinyl alcohol-based polymer as a main component of such a fluid loss reducing agent. For example, in Patent Literatures 1 and 2, PVA used as a fluid loss reducing agent is described.

CITATION LIST

Patent Literature

Patent Literature 1
International Publication No. WO 2007/146348
Patent Literature 2
Japanese Patent Laid-Open No. 2015-196733

SUMMARY OF INVENTION

Technical Problem

In recent years, wells, particularly shale gas wells, have been mined deeper, so that pressure and temperature conditions have become more severe. However, the conventional PVA-containing fluid loss reducing agent has not yet achieved the fluid loss reducing performance required for the cement slurry injected under such severe conditions at high temperature and high pressure. Specifically, the conventional PVA-based fluid loss reducing agent melts at high temperature and is eluted into a well under high pressure conditions, so that the fluid loss reducing effect is impaired. Therefore, PVA-based fluid loss reducing agents are required to have resistance to melting at high temperature. The present countermeasure is to increase the amount of conventional fluid loss reducing agent added. However, the problems of decrease in fluidity and increase in cost due to thickening of the cement slurry resulting from the increased amount of the fluid loss reducing agent are unsolved.

Solution to Problem

In order to solve the problems, the present invention can provide the following aspects:

A polyvinyl alcohol-based polymer, as a saponificated product of:
  a homopolymer composed of a vinyl ester monomer;
  a copolymer of a vinyl ester monomer and a monofunctional monomer other than the vinyl ester;
  a copolymer of a vinyl ester monomer and a polyfunctional monomer; or
  a copolymer of a vinyl ester monomer, a monofunctional monomer other than vinyl ester, and a polyfunctional monomer,
wherein the polyvinyl alcohol-based polymer has a slope of 1.2 or less in a double logarithmic plot of storage elastic modulus G' (at 20° C.) in an angular frequency region of 1.0 to 10.0 rad/s, in measurement of an aqueous solution of the polyvinyl alcohol-based polymer filtered through a 100-mesh filter (opening: 0.154 mm) and then adjusted to a concentration of 10.0 mass %.

In an aspect, it is preferable that the 10.0 mass % aqueous solution after filtration may have a value of angular frequency-dependent loss tangent (tan δ) of 1.0 to 10.0 in an angular frequency region of 0.1 to 100 rad/s. Further, in an aspect, it is preferable that the polyvinyl alcohol-based polymer may have a degree of saponification of 72 to 99 mol %. Further, in an aspect, an additive for oil well cement containing the polyvinyl alcohol-based polymer may also be provided.

Advantageous Effects of Invention

The polyvinyl alcohol-based polymer according to the present invention exhibits an excellent effect of reducing fluid loss even in a severe high-temperature or high-pressure environment.

DESCRIPTION OF EMBODIMENT

Figure 1:
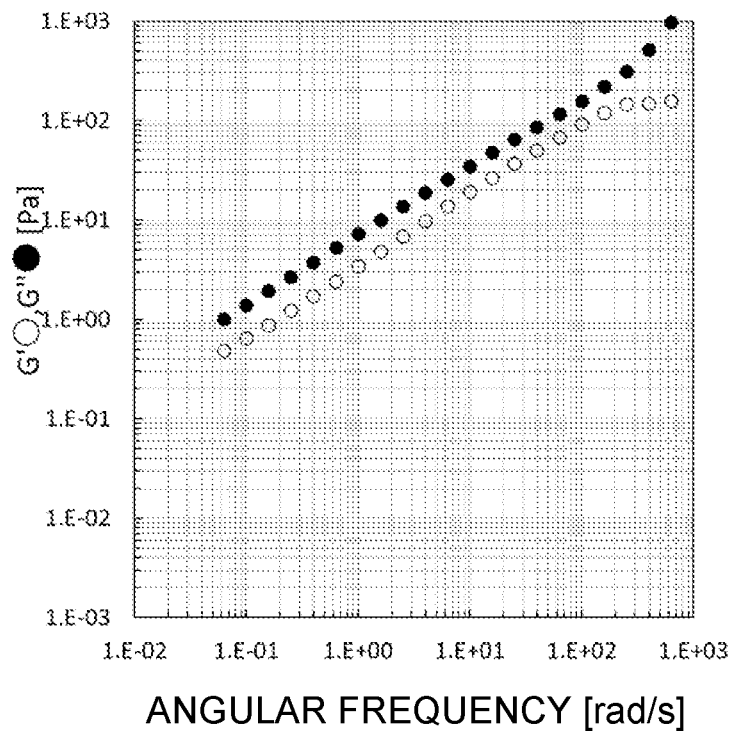
FIG. 1 is a graph showing double logarithmic plots of storage elastic modulus G' and loss elastic modulus G" of an aqueous solution of polyvinyl alcohol-based polymer filtered through a 100-mesh filter (opening: 0.154 mm) and then adjusted to a concentration of 10.0 mass % in Example 1, measured at 20° C.

Hereinafter, embodiments of the present invention will be described. The following shows an example of the embodiments of the present invention, and the scope of the present invention is not narrowed thereby. Unless otherwise specified, numerical ranges in the specification include the upper limit value thereof and the lower limit value thereof. In the specification, a polymer is as defined by International Union of Pure and Applied Chemistry (IUPAC) Commission on Macromolecular Nomenclature, that is, "polymer molecule is a molecule having a large relative molecular mass and has a structure composed of a large number of repetitions of a unit that is substantially or conceptually obtained from a molecule having a small relative molecular mass".

Chemical Structure of Polyvinyl Alcohol-Based Polymer

The polyvinyl alcohol-based polymer of the present invention is a polymer produced by saponification of a homopolymer composed of a vinyl ester monomer, a copolymer of a vinyl ester monomer and a monofunctional monomer other than the vinyl ester, a copolymer of a vinyl ester monomer and a polyfunctional monomer, or a copolymer of a vinyl ester monomer, a monofunctional monomer other than vinyl ester, and a polyfunctional monomer. The polyvinyl alcohol-based polymer of the present invention has a polymer structure that can withstand high temperature/pressure intolerable for conventional PVA. Having such a polymer structure may be determined from the rheological properties of the polymer, and more specifically ensured by the storage elastic modulus G' of PVA within a predetermined range under specific conditions.

In the art, it is empirically known that the steric configuration of the molecular chains of a polymer is reflected in the values of storage elastic modulus G' and storage loss modulus G". The value obtained by dividing the loss elastic modulus G" by the storage elastic modulus G', that is, G"/G', is referred to as loss tangent (tan δ). Generally, in the case of a fluid having fluidity, G">G'. In the double logarithmic plot of PVA having a straight chain, the slope is approximately 1 for G" and 2 for G', so that the gap therebetween increases as the frequency becomes lower. That is, the value of tan δ is large in the low frequency region. The present inventor has found that as the gel properties of PVA are intensified, both of the slopes of G" and G' in the double logarithmic plot approach about 1 in a wide frequency range including the low frequency range, that is, tan δ does not increase. Such findings are described, for example, in the following literature. https://aip.scitation.org/doi/abs/10.1063/1.1770590 The present inventor has found that by controlling the structure of PVA, a storage elastic modulus G' unobtainable from conventional PVA may be obtained, so that the present invention has been completed.

Preparation of Polyvinyl Alcohol-Based Polymer

Examples of the vinyl ester monomer described above may include vinyl acetate, vinyl propionate, vinyl butyrate, vinyl valerate, vinyl caprate, vinyl laurate, vinyl stearate, vinyl benzoate, vinyl pivalate, and a mixture thereof may be used. Vinyl acetate is preferred from the viewpoint of easy polymerization.

Further, examples of monofunctional monomers copolymerizable with a vinyl ester monomer (that is, monofunctional monomers other than vinyl ester) include the following compounds: an α-olefin monomer such as ethylene and propylene; a (meth)acrylic acid alkyl ester monomer such as methyl(meth)acrylate, ethyl(meth)acrylate, butyl(meth)acrylate, and 2-ethylhexyl(meth)acrylate; an unsaturated amide monomer such as (meth)acrylamide and N-methylol acrylamide; an unsaturated carboxylic acid monomer such as (meth)acrylic acid, crotonic acid, maleic acid, itaconic acid, and fumaric acid; an alkyl (methyl, ethyl, propyl, etc.) ester monomer of unsaturated carboxylic acid; an anhydrate of unsaturated carboxylic acid such as maleic anhydride; a sodium, potassium or ammonium salt of unsaturated carboxylic acid; a monomer containing sulfonic acid group such as 2-acrylamide methylpropanesulfonic acid or a salt thereof; and an alkyl vinyl ether monomer.

As the polyfunctional monomer copolymerizable with the vinyl ester monomer, a compound having two or more polymerizable unsaturated bonds in a molecule may be used. Examples of such a compound include the following: a divinyl ether such as ethanediol divinyl ether, propanediol divinyl ether, butanediol divinyl ether, ethylene glycol divinyl ether, diethylene glycol divinyl ether, triethylene glycol divinyl ether, polyethylene glycol divinyl ether, propylene glycol divinyl ether, and polypropylene glycol divinyl ether, and a divinyl sulfonic acid compound; a diene compound such as pentadiene, hexadiene, heptadiene, octadiene, nonadiene, and decadiene; a diallyl ether compound such as glycerol diallyl ether, diethylene glycol diallyl ether, ethylene glycol diallyl ether, triethylene glycol diallyl ether, polyethylene glycol diallyl ether, trimethylolpropane diallyl ether, and pentaerythritol diallyl ether; a triallyl ether compound such as glycerol triallyl ether, trimethylolpropane triallyl ether, and pentaerythritol triallyl ether; a tetraallyl ether compound such as pentaerythritol tetraallyl ether; a polyfunctional monomer containing an allyl ester group such as diallyl phthalate, diallyl maleate, diallyl itaconate, diallyl terephthalate, and diallyl adipate; a diallylamine compound such as diallylamine and diallylmethylamine, and a polyfunctional monomer containing an allylamino group such as triallylamine; a polyfunctional monomer containing an allylammonium group such as a diallylammonium salt such as diallyldimethylammonium chloride; a polyfunctional monomer containing two or more allyl groups such as triallyl isocyanurate, 1,3-diallyl urea, triallyl phosphate, and diallyl disulfide; a polyfunctional monomer having (meth)acrylic acid such as ethylene glycol di(meth)acrylate, diethylene glycol di(meth)acrylate, triethylene glycol di(meth)acrylate, polyethylene glycol di(meth)acrylate, propylene glycol di(meth)acrylate, polypropylene glycol di(meth)acrylate, glycerol di(meth)acrylate, glycerol tri(meth)acrylate, pentaerythritol tri(meth)acrylate, trimethylol propane tri(meth)acrylate, ditrimethylol propane tetra(meth)acrylate, pentaerythritol tetra(meth)acrylate, dipentaerythritol hexa(meth)acrylate, and isocyanuric acid tri(meth)acrylate; a polyfunctional monomer having (meth)acrylamide such as N,N'-methylene bis(meth)acrylamide and N,N'-ethylene bis(meth)acrylamide; a polyfunctional aromatic monomer such as divinylbenzene and trivinylbenzene; and a glycidyl group-containing monomer such as allyl glycidyl ether and glycidyl (meth)acrylate.

From the viewpoint of reactivity with a vinyl ester monomer and resistance to decomposition in a saponification reaction, as the compound copolymerizable with the vinyl ester monomer, a compound that is not easily decomposed by an alkali is preferred, and a compound having a carbonyl group or an amide group in the molecule is more preferred. In a preferred embodiment, PVA is obtained by saponifying a copolymer of a vinyl ester monomer and a polyfunctional monomer to form a crosslinked structure from the polyfunctional group, so that an effect of obtaining resistance to melting at high temperature is achieved. As such a polyfunctional monomer, a compound having a ring structure is preferred, a compound having a heterocyclic structure is more preferred, and triallyl isocyanurate (TAIC) is particularly preferred.

Regarding the amount of copolymerization in copolymerization of a vinyl ester monomer and another monomer, relative to 100 mol % of the structural unit derived from the vinyl alcohol unit in the vinyl alcohol-based polymer, the amount of the structural unit derived from a monomer other than vinyl ester is controlled to preferably 0.001 to 1.0 mol %, more preferably 0.005 to 0.5 mol %, and still more preferably 0.01 to 0.2 mol %. Through adjustment of the amount of copolymerization in such a range, the resistance to melting at high temperature is improved, and the vinyl alcohol-based polymer is not excessively crosslinked, which is preferable from the viewpoint of production.

The amount of copolymerization may be calculated using a trace total nitrogen analyzer. For example, in the case of using a trace total nitrogen analyzer TN-2100H (manufactured by Nittoseiko Analytech Co., Ltd.), the calculation may be performed by the following procedure.

A sample of vinyl alcohol-based polymer is collected on a quartz board, set in an auto boat controller ABC-210 (manufactured by Nittoseiko Analytech Co., Ltd.), automatically put in an electric furnace, and burnt in an argon/oxygen stream. NO gas generated on this occasion is measured by a chemiluminescence detector. A calibration curve is prepared in advance with use of a standard solution (N-pyridine/toluene), and the nitrogen concentration is calculated from the calibration curve.

Example of Measurement Conditions:
Reaction tube: Double tube for ABC
Electric Furnace Temperature
Inlet Temp: 800° C., Outlet Temp: 900° C.
Gas flow rate: Ar: 300 mL/min, $O_2$: 300 mL/min, Ozone: 300 mL/min
Amount of sample: approximately 9 to 15 mg Any method may be used for polymerization of the vinyl ester monomer or the copolymer thereof, and a known polymerization method such as solution polymerization, suspension polymerization, and bulk polymerization may be used. From the viewpoint of easy operation and using a solvent common to a saponification reaction in the subsequent step, use of solution polymerization method in alcohol is preferred, and use of methanol as the alcohol is particularly preferred.

PVA may be prepared through saponification of the polymer obtained as described above by any method. Examples of the saponification method include adding an alkaline catalyst to alcohol solution of a polymer (polyvinyl ester or the like). Hereinafter, an example of the saponification procedure will be described.

As the alcohol that serves as a solvent for the polymer, for example, methanol, ethanol, butanol, etc. may be used, and methanol may be favorably used. The concentration of the polymer in the alcohol solution may be optionally set, and may be, for example, 10 mass % or more and 80 mass % or less.

Then, an alkaline catalyst is added to the solution to perform a saponification reaction. Examples of the alkaline catalyst include an alkali metal hydroxide such as sodium hydroxide, potassium hydroxide, sodium methylate, sodium ethylate, and potassium methylate, and an alcoholate. It is preferable to use sodium hydroxide, in particular. The amount of the alkaline catalyst added is not particularly limited, being preferably 1.0 to 100.0 mmol equivalent, and more preferably 5.0 to 30.0 mmol equivalent, relative to the polymer. The reaction temperature during saponification is not particularly limited, being preferably 10 to 70° C., more preferably 30 to 55° C. The reaction time is also not particularly limited, and may be, for example, 20 minutes or more to 2 hours.

The degree of saponification may be appropriately adjusted according to the use of PVA, and may be, for example, 72 to 99 mol %. After the saponification reaction, a washing step for removing impurities such as sodium acetate and a drying step may be performed, on an as needed basis.

Additive for Oil Well Cement

In an embodiment, an additive for oil well cement containing the PVA described above may be provided for suitable use in cementing oil wells, gas wells, steam wells for geothermal power generation, etc.

Cementing during drilling of a well is an operation for injecting cement into a gap between a drilled well and a steel pipe inserted therein. As a cementing method, a method including mixing cement and various additives such as fluid loss additive in a dry state and then slurrying the mixture with high-pressure water for injection with a pump is widely employed.

With use of PVA as fluid loss reducing agent, reduction in the water content loss from cement slurry is achieved during cementing (that is, reduction of fluid loss), so that fluidity of the cement slurry is maintained. With a large fluid loss, fluidity of the cement slurry is lost, so that sufficient cementing is hardly performed.

The evaluation of fluid loss is one of the evaluation items of oil well cement defined by American Petroleum Institute (API). The test method for fluid loss is described in Recommended Practice for Testing Well Cements, API Recommended Practice 10B-2, April 2013.

Cement Composition for Oil Well Cement

In an embodiment, an oil well cement composition containing an oil well cement and the additive for oil well cement may be provided. The oil well cement is not particularly limited as long as it is a cement for use in cementing oil wells, gas wells, steam wells for geothermal power generation, etc.

The composition has a content of the additive for oil well cement of preferably 0.01 to 10% bwoc, more preferably 0.05 to 5% bwoc. With such a range, fluid loss is effectively reduced. Herein, "bwoc" (by weight of cement) means a cement weight basis, referring to the weight of a dry additive added to a cement composition based on the solid content of cement only.

Cement Slurry for Oil Well

In an embodiment, a cement slurry for oil well that contains oil well cement, the additive for oil well cement, and water may be also provided. The cement slurry has a water content of preferably 20 to 40 mass %.

The method for introducing an additive for oil well cement into a cement slurry is not particularly limited. Examples of the method include a process including preparing a composition containing an oil well cement and an additive and then mixing the composition with water, and a process including mixing an oil well cement, an additive and water without preparing a composition.

EXAMPLES

Hereinafter, the present invention will be described in more detail based on Examples. The examples described below illustrate typical examples of the present invention, and the present invention is not limited to the following examples.

Preparation of PVA

Example 1

A polymerization can equipped with a reflux condenser, a dropping funnel, and a stirrer was provided. The can was charged with 100 parts by mass of vinyl acetate, 67 parts by mass of methanol, 0.16 parts by mass of triallyl isocyanurate (TAIC) as a polyfunctional monomer, and $5.0 \times 10^{-6}$ parts by mass of Peroyl NPP (manufactured by NOF Corporation) as initiator, and polymerization was performed at a boiling point for 5.0 hours while stirring in a nitrogen atmosphere. Then, an unreacted vinyl acetate monomer was removed from the polymerization system to obtain a methanol solution of polyvinyl acetate-TAIC copolymer.

To the resulting methanol solution of vinyl acetate-TAIC copolymer, a methanol solution of sodium hydroxide was added (0.008 mol % of sodium hydroxide relative to the copolymer). Then, a saponification reaction was performed at 45° C. for 45 minutes to obtain PVA having a saponification degree of 88.2 mol %.

Examples 2 to 3 and Comparative Examples 1 to 3

PVA in each of Examples 2 to 3 and Comparative Examples 1 to 3 was obtained by the same procedure as in Example 1 except that the amounts charged were changed as shown in the following Table 1.

Measurement of Physical Properties of PVA
Degree of Saponification

Measurement and calculation were performed in accordance with Japanese Industrial Standard, JIS K 6726: 1994, section 3.5 "Degree of Saponification".

Measurement of Storage Elastic Modulus G', Loss Elastic Modulus G", and Loss Tangent (Tan δ)

The measurement of storage elastic modulus G', loss elastic modulus G", and loss tangent (tan δ) was performed by the following method.

An aqueous solution of 10 mass % or more of PVA was prepared, and filtered with a 100-mesh filter (opening: 0.154 mm). The concentration of the aqueous solution after filtration was measured. In the case where the concentration was 10 mass % or more, pure water was added to adjust the concentration to 10 mass %. The dynamic viscoelasticity of the solution thus adjusted was measured using a rheometer (MCR manufactured by Anton Paar). The plate used was a cone plate CP50-2 (diameter: 50 mm, angle: 2°). Under measurement conditions at a temperature of 30° C., shear strain (vibration) of 1 to 5% (logarithmic slope), and angular frequency of 628.3 to 0.06 rad/s (linear slope), storage elastic modulus G' and loss elastic modulus G" were obtained. The loss tangent (tan δ) was calculated from (Loss elastic modulus G"/Storage elastic modulus G').

Figure 2:
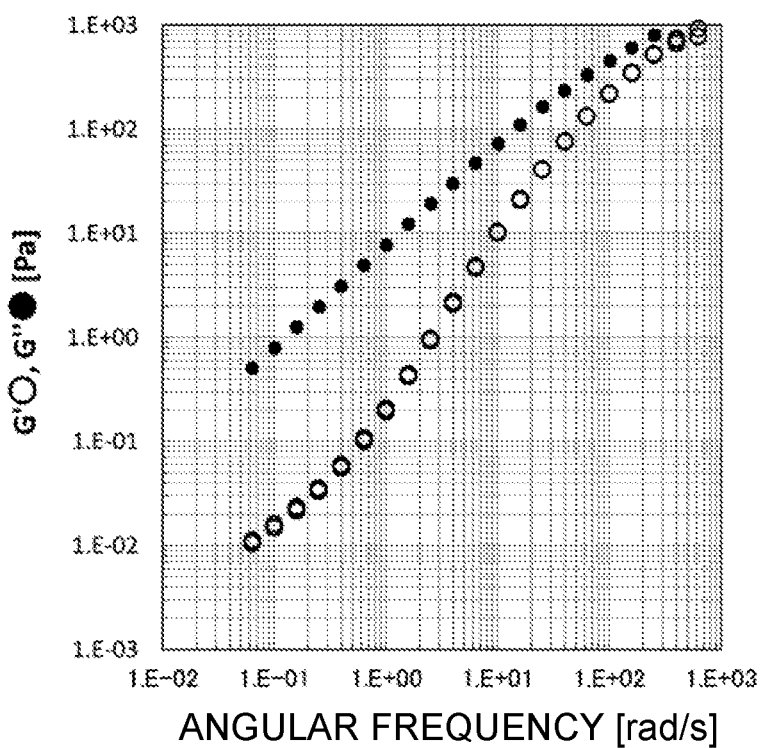
FIG. 2 is a graph showing double logarithmic plots of storage elastic modulus G' and loss elastic modulus G" of an aqueous solution of polyvinyl alcohol-based polymer filtered through a 100-mesh filter (opening: 0.154 mm) and then adjusted to a concentration of 10.0 mass % in Comparative Example 1, measured at 20° C.

The double logarithmic plots of storage elastic modulus G' and loss elastic modulus G" thus obtained are shown in FIG. 1 for Example 1, and in FIG. 2 for Comparative Example 1, respectively.

Measurement of Fluid Loss

The effect of reduction in fluid loss of PVA was measured in accordance with the fluid loss evaluation method in American Petroleum Institute (API) standard 10B-2, April 2013 edition. The specific measurement procedure is as follows.

A well cement in class G was blended with PVA in an amount described in Table 1 and 0.4% bwoc of a curing retarder (CR-270, manufactured by Flotek Industries), and water was mixed therewith according to the procedure described in American Petroleum Association (API) standard 10B-2 (April 2013 edition) to obtain a cement slurry having a water content of 30 mass %. The resulting cement slurry was put into a fluid loss evaluation tester (Model 7120, manufactured by Chandler Engineering), and subjected to a test according to the procedure described in American Petroleum Institute (API) Standard 10B-2 (April 2013 edition) at the temperature described in Table 1 under a pressure of 1000 psi to calculate the amount of fluid loss.

As shown in Table 1, the temperature was set in the range of 40° C. to 140° C., and the amount of PVA added was set in the range of 0.4 to 1.2% bwoc to perform the evaluation. In Table 1, the sign "-" indicates that no measurement of the fluid loss was performed.

TABLE 1

| | | | Example 1 | Example 2 | Example 3 | Comparative Example 1 | Comparative Example 2 | Comparative Example 3 |
|---|---|---|---|---|---|---|---|---|
| Charge | Vinyl acetate | [Parts by mass] | 100 | 100 | 100 | 100 | 100 | 100 |
| | Methanol | [Parts by mass] | 67 | 67 | 150 | 5.3 | 5.3 | 21 |
| | Polyfunctional | Type | TAIC | TAIC | TAIC | — | — | TAIC |
| | monomer | [Parts by mass] | 0.16 | 0.16 | 0.33 | — | — | 0.04 |
| | Conversion of vinyl acetate | [%] | 56 | 42 | 69 | 43 | 43 | 50 |
| Physical properties of PVA | Slope of G' | | 0.7 | 1.1 | 0.9 | 1.7 | 1.7 | 1.3 |
| | Maximum value of tan δ | | 2.2 | 8.8 | 3.8 | 39.6 | 58.7 | 18.8 |
| | Minimum value of tan δ | | 1.7 | 2.1 | 1.5 | 2.1 | 2.5 | 2.0 |
| | Degree of saponification | [mol %] | 88.2 | 88.1 | 80.1 | 80.1 | 88.2 | 80.0 |
| Temperature [° C.] | Amount of PVA added [% bwoc] | | | | | | | |
| Fluid Loss [mL] | 40 | 0.4 | [cc] | 18 | 15 | 28 | 15 | 14 | 26 |
| | 60 | 0.6 | [cc] | 24 | 28 | 34 | 10 | 1077 | 28 |
| | 80 | 0.8 | [cc] | 32 | 34 | 44 | 224 | — | 32 |
| | 100 | 0.8 | [cc] | 35 | 54 | 71 | — | — | 356 |
| | 110 | 0.8 | [cc] | 42 | 46 | 92 | — | — | — |
| | 120 | 0.8 | [cc] | 96 | 99 | 780 | — | — | — |
| | 120 | 1.2 | [cc] | 30 | 140 | 660 | — | — | — |
| | 140 | 1.2 | [cc] | 45 | — | — | — | — | — |

From the results in Examples, it has been confirmed that the additive for oil well cement of the present invention is excellent in the performance for reduction in fluid loss.

The invention claimed is:

1. A polyvinyl alcohol-based polymer, comprising a saponificated product of
   a copolymer of a vinyl ester monomer and a polyfunctional monomer,
   wherein the polyvinyl alcohol-based polymer has a slope of 1.2 or less in a double logarithmic plot of storage elastic modulus G' (at 20° C.) in an angular frequency region of 1.0 to 10.0 rad/s, in measurement of an aqueous solution of the polyvinyl alcohol-based polymer filtered through a 100-mesh filter (opening: 0.154 mm) and then adjusted to a concentration of 10.0 mass %.

2. The polyvinyl alcohol-based polymer according to claim 1, wherein the aqueous solution of the polyvinyl alcohol-based polymer filtered through a 100-mesh filter (opening: 0.154 mm) and then adjusted to a concentration of 10.0 mass % has a value of angular frequency-dependent loss tangent (tan δ) of 1.0 to 10.0 in an angular frequency region of 0.1 to 100 rad/s.

3. The polyvinyl alcohol-based polymer according to claim 1, wherein the polyvinyl alcohol-based polymer has a degree of saponification of 72 to 99 mol %.

4. An additive for oil well cement, comprising the polyvinyl alcohol-based polymer according to claim 1.

* * * * *